(12) United States Patent
Blom et al.

(10) Patent No.: US 9,749,318 B2
(45) Date of Patent: Aug. 29, 2017

(54) KEY MANAGEMENT IN A COMMUNICATION NETWORK

(71) Applicant: Telefonaktiebolaget LM Ericsson (publ), Stockholm (SE)

(72) Inventors: Rolf Blom, Järfälla (SE); Fredrik Lindholm, Stockholm (SE); Mats Näslund, Bromma (SE); Karl Norrman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/454,936

(22) Filed: Aug. 8, 2014

(65) Prior Publication Data

US 2014/0351595 A1 Nov. 27, 2014

Related U.S. Application Data

(63) Continuation of application No. 13/063,997, filed as application No. PCT/EP2009/052967 on Mar. 13, 2009, now Pat. No. 8,837,737.

(60) Provisional application No. 61/097,382, filed on Sep. 16, 2008.

(51) Int. Cl.
*H04L 9/08* (2006.01)
*H04L 29/06* (2006.01)
*H04L 9/32* (2006.01)

(52) U.S. Cl.
CPC .......... *H04L 63/0869* (2013.01); *H04L 9/083* (2013.01); *H04L 9/0819* (2013.01); *H04L 9/3213* (2013.01); *H04L 63/06* (2013.01); *H04L 63/0428* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 6,940,976 | B1 | 9/2005 | Matyas, Jr. et al. |
| 7,293,098 | B2 | 11/2007 | Sandhu et al. |
| 7,395,549 | B1 | 7/2008 | Perlman et al. |
| 7,987,366 | B2 | 7/2011 | Blom et al. |
| 8,014,523 | B2 | 9/2011 | Näslund |

(Continued)

FOREIGN PATENT DOCUMENTS

| | | |
|---|---|---|
| EP | 1940073 A1 | 7/2008 |
| WO | 2005078988 A1 | 8/2005 |

*Primary Examiner* — Michael R Vaughan
(74) *Attorney, Agent, or Firm* — Coats & Bennett, PLLC

(57) ABSTRACT

A method and apparatus for key management in a communication network. A Key Management Server (KMS) receives from a first device a request for a token associated with a user identity, the user identity being associated with a second device. The KMS then sends the requested token and a user key associated with the user to the first device. The KMS subsequently receives the token from the second device. A second device key is generated using the user key and a modifying parameter associated with the second device. The modifying parameter is available to the first device for generating the second device key. The second device key is then sent from the KMS to the second device. The second device key can be used by the second device to authenticate itself to the first device, or for the first device to secure communications to the second device.

20 Claims, 5 Drawing Sheets

(56) References Cited

U.S. PATENT DOCUMENTS

| | | | |
|---|---|---|---|
| 9,106,409 B2* | 8/2015 | Blom | H04L 63/062 |
| 2005/0031126 A1* | 2/2005 | Edney | H04L 63/0428 |
| | | | 380/278 |
| 2005/0180315 A1* | 8/2005 | Chitrapu et al. | 370/208 |
| 2005/0204163 A1* | 9/2005 | Alkove et al. | 713/201 |
| 2006/0010324 A1 | 1/2006 | Appenzeller et al. | |
| 2006/0205388 A1* | 9/2006 | Semple | H04L 63/0853 |
| | | | 455/411 |
| 2007/0160201 A1 | 7/2007 | Blom et al. | |
| 2008/0052775 A1 | 2/2008 | Sandhu et al. | |
| 2009/0287922 A1 | 11/2009 | Herwono et al. | |
| 2010/0268937 A1 | 10/2010 | Blom et al. | |

* cited by examiner

KEY MANAGEMENT IN A COMMUNICATION NETWORK

RELATED APPLICATIONS

The present application is a continuation of U.S. patent application Ser. No. 13/063,997, which was filed on Mar. 15, 2011, which is a national stage application of PCT/EP2009/052967, filed Mar. 13, 2009, and claims benefit of U.S. Provisional Application 61/097,382, filed Sep. 16, 2008, the disclosures of each of which are incorporated herein by reference in their entirety.

TECHNICAL FIELD

The invention relates to the field of key management in a communication network, and in particular to the field of key management for the purpose of authentication or secure communication.

BACKGROUND

End to end (e2e) media in a communication network can be protected using a ticket based key management solution, as described in PCT/SE2007/050927, and illustrated in FIG. 1 herein. In the communication network shown, User A 1 can communicate with User B 2 and also a Key Management Server (KMS) 3. Similarly, User B 2 can communicate with User A 1 and the KMS 3. When User A 1 initiates a call to User B 2, User A 1 first sends S1 to the KMS 3 a request for a key to base security on (the security is used to secure the media or other type of communication between User A 1 and User B 2) and a ticket for User B 2. The KMS 3 sends a response S2 to User A that includes a key and a ticket for User B 2. The ticket either contains the key, or it contains a reference to the key which is stored in the KMS. User A then sends S3 a message to User B 2 to initiate a communication. This message includes the ticket that User A previously received from the KMS 3. When User B 2 receives the ticket from User A 1, User B 2 sends S4 the ticket to the KMS 3 with a request that the KMS shall resolve (i.e. return the key associated with) the ticket. The KMS 3 sends a response S5 to User B that includes the key. Once User B 2 has the key, it can receive secured data from, and transmit data to, User A. The ticket may contain more information than the key itself, such as key life-time, intended receiver, usage rules, etc. Another example of a ticket based scheme is the well-known and widely deployed Kerberos scheme.

A problem with such a system occurs when forking is required. Forking occurs when, for example, an INVITE message is directed to several devices (simultaneously or sequentially) and the first one to answer picks up the call. Forking is used to reach a person who has several devices and would like to be able to pick up a call on anyone of them. Another situation in which forking may be used is in a manager and secretary environment. The call is first directed to the secretary, and if the secretary doesn't answer, the manager may pick up the call (or vice versa). If this situation is solved by the use of forking, it means that both the manager's and the secretary's phone will ring simultaneously or first the secretary's and then the manager's phone rings and the first one to pick up the phone picks up the call.

The ticket based system doesn't provide an efficient and secure solution to the forking problem. User A 1 cannot in advance know for certain which device will pick up a call, and so it must request a ticket associated with a key that can be used by any device in a group of devices to which the call is forked. This would then mean that either all of those devices in the group of devices could send the ticket to the KMS 3 and receive the key, or the KMS 3 could implement a policy that it only returns a key to one device, for example the device that first requests the key. The first option is inappropriate in many scenarios. In particular, where accountability is needed, there is a risk that the devices can get infected by malicious software, or several physical persons may share the same subscription. The second option requires the KMS 3 to maintain state, which is undesirable from the perspective of reliability, storage space and Denial of Service (DoS). The KMS 3 would either have to hold information about all tickets that have been generated and are valid but which have not been resolved, or it would have to keep a record for the remaining life-times of all tickets submitted for resolution. Setting an appropriate life-time is a difficult issue; it should be as short as possible to minimize the storage needed by the KMS 3, but it should also be long enough to cover circumstances where a long ticket life is required, such as if a user wishes to resolve tickets for messages left on the user's answering machine after coming back from a four-week vacation.

For security reasons it is essential that all the devices that may be included in the forking should use different keys. For example, the secretary should not in general have access to the key used by the manager. A proposed IETF solution (Datagram Transport Layer Security (DTLS) Extension to Establish Keys for Secure Real-time Transport Protocol (SRTP) draft-ietf-avt-dtls-srtp-06.txt) relies on negotiating the key in the media plane. Of course, this requires that the call has been established and that the negotiation traffic can and is allowed to be carried in the media plane. If several of the devices that the forking included negotiate a key, their keys will be different. However, this solution is not easily adaptable to a ticket based key management system. Proposed 3GPP solutions (such as TR 33.828v0.8.0 clause 6.4.5) include letting the terminating device define the key, or use a combination of a key generated on the initiating side and a key generated by the terminating device. The proposed solution of having the terminating device generate the key suffers from the problem that either the sender and receiver has to have established shared keying material already, or an existing public key infrastructure needs to be in place to secure the transport of key information from the terminating to the initiating device.

SUMMARY

It is an object of the invention to provide a ticket based key management solution in scenarios where a user receiving a call or communication session may have the invitation to the communication session forked to one of a number of devices associated with a user identity. The keys may be used, for example, to secure communication between devices, or to allow one device to authenticate itself to another device. According to a first aspect of the invention, there is provided a method of key management for a first and second device in a communication network. A Key Management Server (KMS) receives from the first device a request for a token associated with a user identity. The KMS then sends the requested token and a user key associated with the user to the first device. The KMS then receives the token from a second device, the second device being associated with the user identity. A second device key is generated using the user key and a modifying parameter associated with the second device. The modifying parameter is available to the first device for generating the second device key. The second device key is then sent from the KMS to the second device. This allows the second device to authenticate itself to the first device, and alternatively or additionally allows the first device to secure communications to the second device.

As an option, the first device uses the modifying parameter and the user key to generate the second device key prior to secure communication between the first device and the second device.

The modifying parameter is optionally received at the KMS from the second device prior to generating the second device key. Alternatively, the modifying parameter is generated at the KMS prior to generating the second device key.

As an option, the modifying parameter is selected from any of a pseudo-random number, an identity associated with the terminating device, a Globally Routable UA Uniform Resource Identifier, a Network Application Function-initial key, an IP Multimedia Private Identity associated with the terminating device and an International Mobile Subscriber Identity associated with the terminating device.

The step of generating the second device key optionally includes using both the modifying parameter and at least one further parameter. The further parameter is optionally selected from a time stamp, an identity associated with the first device, an identity associated with the second device, an identity associated with the first user, an identity associated with the second user, and an identity associated with the KMS, the method further comprising sending an indication of the further parameter to the originating device.

Where the invention is required for authentication, the KMS receives from the second device, in addition to the token, an identity parameter relating to the user's identity, and then uses the identity parameter to generate the second device key. The second device can then optionally use the second device key to generate a Message Authentication Code, and send the Message Authentication Code to the first device. This enables the first device to authenticate the second device using the Message Authentication Code and the user's identity.

In cases where the first device and the second devices are each attached to a different KMS, the token received from the second device is optionally received via a second KMS, and the second device key is optionally sent to the second device via the second KMS.

The user identity optionally identifies a single user, a group of users, or any user.

According to a second aspect of the invention, there is provided a KMS for use in a communication network. A first receiver function is provided for receiving from a first device a request for a token associated with a user identity. A first transmitting function is provided for transmitting the token and a user key associated with the user identity to the first device. A second receiving function is provided for receiving a message from a second device, the second device being associated with the user identity and the message including the token. A processing function is provided to generate a second device key using a modifying parameter associated with the second device. A second transmitting function is further provided for transmitting the second device key to the second device, the key being usable by the second device to authenticate itself with the first device.

The processing function of the KMS is optionally further arranged to obtain the modifying parameter prior to generating the terminating device key.

According to a third aspect of the invention, there is provided an originating device for use in a communication network. The device is provided with a first transmitting function for sending to a KMS a request for a user key, and a token associated with a user identity with which the device wishes to establish a communication. A first receiving function is provided for receiving the user key and the token from the KMS. A second transmitting function is provided for sending to the user identity a request to establish a communication, the request including the token. A second receiving function is provided for receiving a modifying parameter from a second device, the second device being associated with the user identity. A processor is provided for using the modifying parameter and the user key to generate a second device key, and a third transmitting function is provided for sending a communication to the second device, the communication being secured using the second device key.

According to a fourth aspect of the invention, there is provided a terminating device for use in a communication network. A first receiver function is provided for receiving from an originating device a request to establish a communication. The request includes a token associated with a receiving user identity. A first transmitting function is provided for sending the token to a KMS. A second receiver function is provided for a terminating device key receiving from the KMS, and a third receiver function is provided for receiving from the originating device a communication secured using the terminating device key.

As an option, the terminating device is provided with a second transmitter function for sending to the originating device a modifying parameter used to generate the terminating device key. Alternatively the terminating device has a processor for obtaining the modifying parameter.

According to a fifth aspect of the invention, there is provided a computer program which comprises computer readable code means which, when run on a KMS, causes the KMS to behave as a KMS described above in the second aspect of the invention.

According to a sixth aspect of the invention, there is provided a computer program product comprising a computer readable medium and a computer program as described above in the fifth aspect of the invention, wherein the computer program is stored on the computer readable medium.

According to a seventh aspect of the invention, there is provided a computer program, comprising computer readable code means which, when run on a device, causes the device to behave as a device as described above in the third aspect of the invention.

According to an eighth fourth aspect of the invention, there is provided a computer program product comprising a computer readable medium and a computer program as described above in the seventh aspect of the invention, wherein the computer program is stored on the computer readable medium.

DETAILED DESCRIPTION

The following description assumes that the ticket based solution of PCT/SE2007/050927 is used. However, a person of skill in the art would realise that the invention described herein is equally applicable to other ticket based systems, e.g. Kerberos, if use cases with forking were to be supported. Furthermore, the following description uses the term INVITE to generically denote a signalling message from an originating party to a terminating party, sent for the purpose of establishing a media communication session, e.g. VoIP or video telephony, between the two parties. The signalling protocol used may, for example, be Session Initiation Protocol (SIP).

Figure 1:
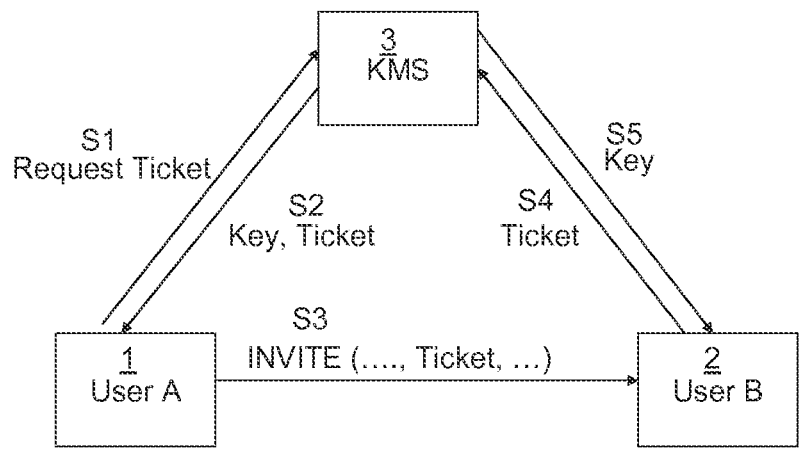
FIG. 1 illustrates schematically in a block diagram the signalling required for a ticket based key management solution in a secure communication procedure.
Figure 2:
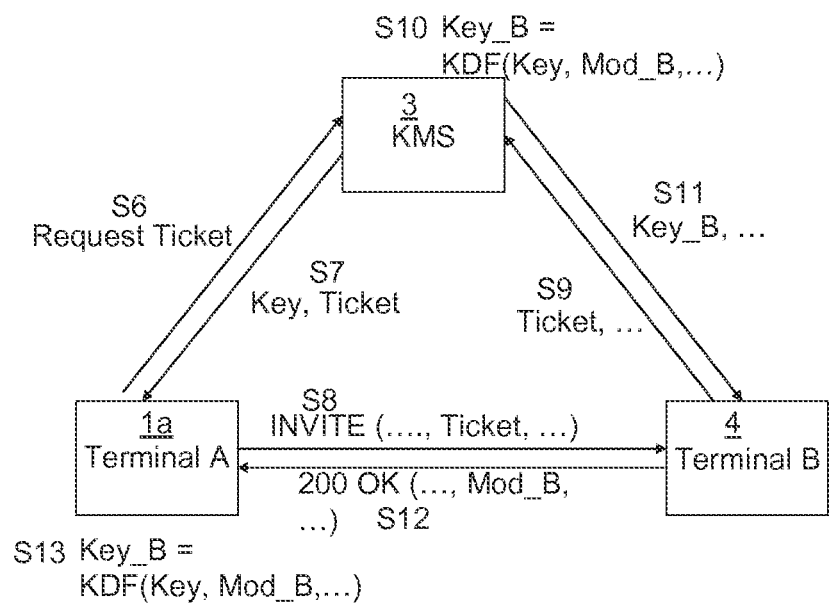
FIG. 2 illustrates schematically in a block diagram signalling and network architecture according to an embodiment of the invention.
Figure 3:
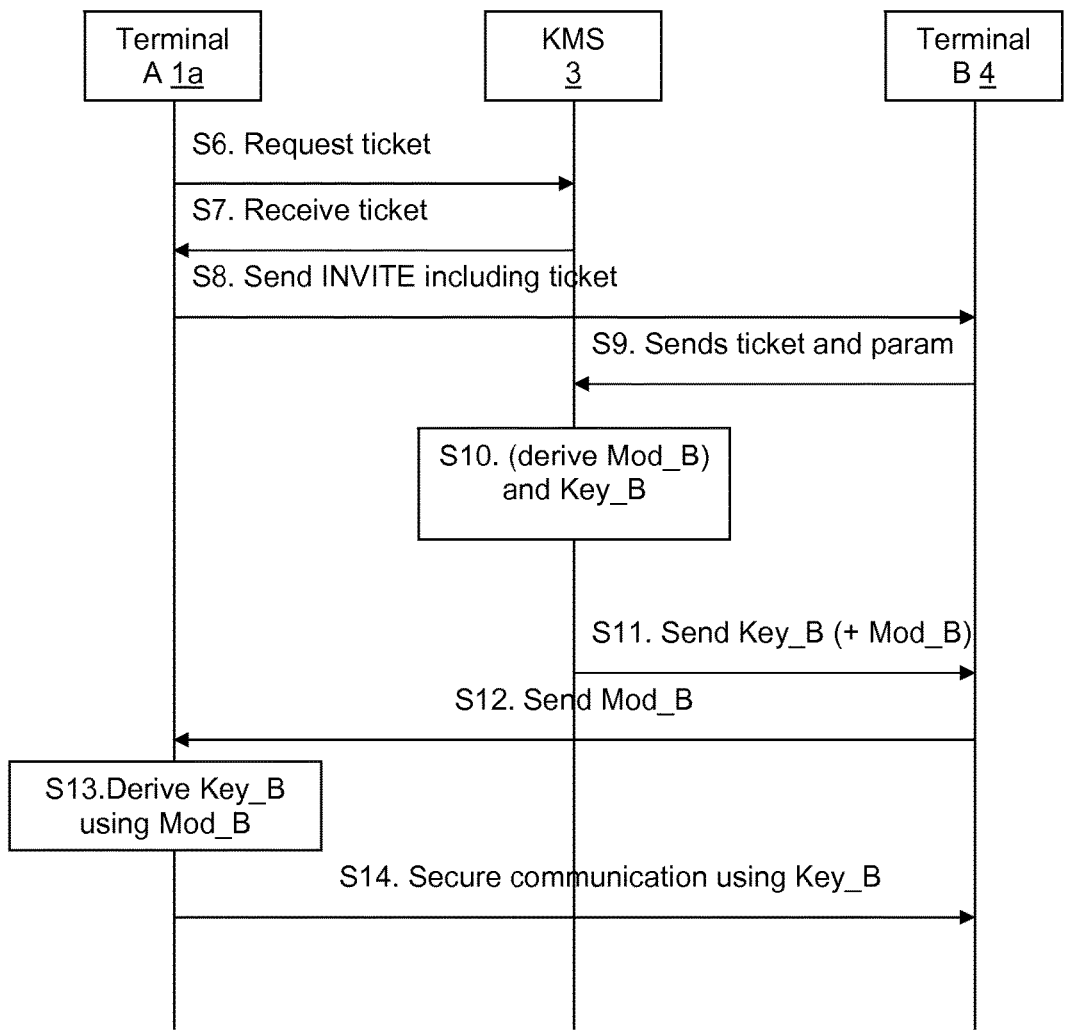
FIG. 3 is a signalling diagram illustrating signalling according to an embodiment of the invention.

Referring to FIGS. 2 and 3 herein, Terminal B (User B) 2 sends a ticket which was previously received from Terminal A 1a to the KMS 3 with a request for a key on which the protection of a communication between User A and User B should be based. The KMS 3 then responds to User B 2 with a device-unique key. The information used in the derivation of the device unique key can be made available to the KMS 3 in different ways, and must be made available to the Terminal A (User A) 1. According to an embodiment of the invention, the following steps are followed, in which the numbering corresponds to the numbering of FIG. 2:

S6. Terminal A 1a requests a key and a ticket from the KMS 3. The request and/or ticket may contain information about the identity of the recipient(s). The recipient may be a single user, an identified group of users or any user.

S7. The KMS 3 returns the key and the ticket to User A, using Terminal A 1a. The key is a base key denoted Key. The key, or a reference to a copy of it which is accessible to the KMS 3, is included in the ticket.

S8. Terminal A 1a sends an INVITE directed to the recipient, User B 2, who uses Terminal B 4. The INVITE includes the ticket. The INVITE is routed to Terminal B 4.

S9. Terminal B 4 sends the ticket together with an initial parameter to the KMS 3. The initial parameter may be based on a random value newly generated for each request, or it may be generated once and reused for a number of requests. The initial parameter can additionally or alternatively be based on an identity which is tied to Terminal B 4 or User B 2 (the identity may be publicly known, in particular it may be known to Terminal A 1a). It might also be a private value from which a public identity for User B 2 can be derived. The communication between Terminal B and the KMS should be confidentiality protected, and in some cases also integrity protected.

S10. The KMS 3 derives a modifying parameter using at least the initial parameter, for example by applying a cryptographic function. An example of a cryptographic function is a hash function. In this case, the modifying parameter Mod_B=Hash (initial parameter). In some cases, the initial parameter may be used directly as Mod_B. The KMS 3 then derives a Terminal B 4 unique key by applying a key derivation function (KDF) on the modifying parameter and the key Key, Key_B=KDF (Key, Mod_B, other parameters). Other parameters that may be input to the KDF are timestamps, identities associated with Terminal A and/or Terminal B, identities associated with User A 1 and/or User B 2, an identity associated with the KMS 3 etc. If other parameters are included in the KDF, these must be either implicitly known to Terminal A 1a and Terminal B or signalled to the Terminal A 1a and Terminal B 4 (which can be done in the same way as the modifying parameter is signalled as described below).

S11. The KMS 3 sends key Key_B and, if necessary, Mod_B, to Terminal B 4. This communication should again be protected.

S12. Terminal B 4 sends Mod_B to Terminal A 1a. Note that Terminal B could have sent a response to Terminal A 1a including the modifying parameter already in step S9, as the modifying value is a well-defined and publicly known cryptographic function of the initial parameter. Note that Terminal B may not have to send Mod_B at all in the event that Mod_B is already known by Terminal A, for example if it is sent by the KMS 3 or if it is a value of Terminal B 4 that is known to Terminal A 1a.

S13. User A's terminal, Terminal A 1a, derives Key_B=KDF (Key, Mod_B, other parameters)

S14. Key_B is used to secure communications with Terminal B 4.

Note that the KDF 3 may have additional or alternative parameters as input, provided that they can be made available to Terminal A 1a, and Terminal A 1a can associated them with the key derivation for Terminal B.

Figure 4:
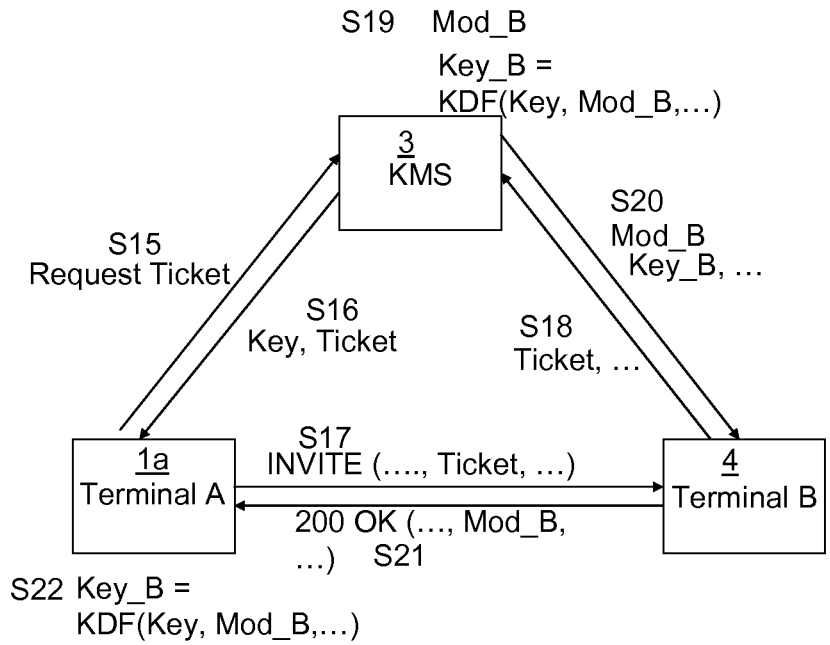
FIG. 4 illustrates schematically in a block diagram signalling and network architecture according to a further embodiment of the invention in which the KMS generates a modifying parameter.

The above embodiment describes Mod_B being created at Terminal B 4. Note that Mod_B may be created at one of several different nodes. In an alternative embodiment of the invention, Mod_B is defined at the KMS 3, as shown in FIG. 4. In this case, the following steps are performed, with the numbering corresponding to the numbering of FIG. 4:

S15. Terminal A 1a requests a key and a ticket from the KMS 3. The request and/or ticket does not have to, but can contain information about the identity of the recipient(s).

S16. The KMS 3 returns the key and the ticket to Terminal A 1a. The key is a base key denoted Key. The key or a reference to a copy of it stored in the KMS 3 is included in the ticket.

S17. Terminal A 1a sends an INVITE including the ticket directed to the recipient, User B 2. The INVITE is routed to User B's Terminal B 4.

S18. Terminal B 4 sends the ticket to the KMS 3.

S19. The KMS 3 generates a modifying parameter. The modifying parameter could be generated at random at each request from the device or it could be reused for a certain number of requests from a given device. The KMS 3 then derives the Terminal B 4 unique key by applying a KDF on the modifying value and the key Key, Key_B=KDF (Key, Mod_B). Note that the KDF may have additional parameters as input provided that they can be made available to Terminal A 1*a*, and Terminal A 1*a* can associate them with the key derivation for Terminal B 4. Parameters that may be input include time-stamps, identities associated with Terminal A and/or Terminal B, identities associated with Terminal A 1*a* and/or User B 2, an identity associated with the KMS 3 etc.

S20. The KMS 3 sends key Key_B and Mod_B to Terminal B 4. The communication between Terminal B 4 and the KMS 3 is preferably protected.

S21. Terminal B 4 sends Mod_B to Terminal A 1*a*. Note that Terminal B 4 could not have sent a response to Terminal A including the modifying value already in step S18 unless Terminal B knows that a previously used Mod_B will be used.

S22. Terminal A 1*a* derives Key_B=KDF (Key, Mod_B), and uses Key_B for secure communications with Terminal B 4.

Figure 5:
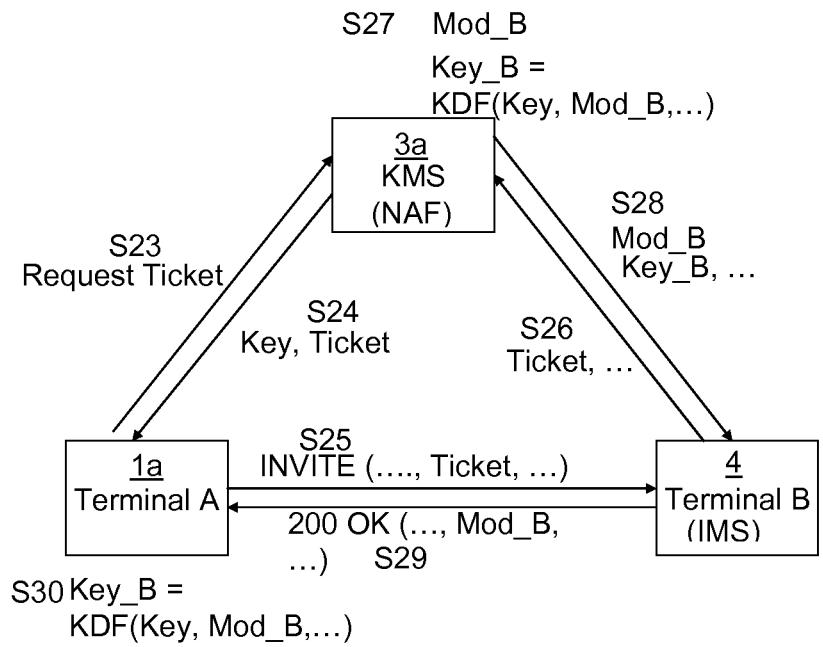
FIG. 5 illustrates schematically in a block diagram signalling and network architecture according to a further embodiment of the invention in which a modifying parameter is defined via a Generic Bootstrapping Architecture system.

In an alternative embodiment, Mod_B is defined via a Generic Bootstrapping Architecture (GBA) system, as illustrated in FIG. 5. In this case, the following steps apply, with the following numbering corresponding to the numbering of FIG. 5:

S23. Terminal A 1*a* requests a key and a ticket from the KMS 3. The request and/or ticket may contain information about the identity of the recipient(s).

S24. The KMS 3 returns the key and the ticket to Terminal A 1*a*. The key is a base key denoted Key. The key or a reference to a copy of it stored in the KMS 3 is included in the ticket.

S25. Terminal A 1*a* sends an INVITE including the ticket directed to the recipient, User B 2. The INVITE is routed to User B's Terminal B 4. In this embodiment, Terminal B is an IMS device with a Universal Subscriber Identity Module (USIM) or IMS Services Identity Module (ISIM).

S26. Terminal B 4 sends the ticket to the KMS 3. The communication between Terminal B 4 and the KMS 3 is protected and the protection is based on a GBA generated key, e.g. a Pre-Shared Key-Transport Layer Security (PSK-TLS). Note that it is not necessary to protect this communication, it is sufficient to transfer the ticket and a valid Bootstrapping Identity (B-TID) to the KMS 3.

S27. The KMS 3*a* generates a modifying parameter. Using existing GBA functions, the KMS 3*a*, which in this embodiment is a Network Application Function (NAF), can learn the IP Multimedia Private Identity (IMPI)/International Mobile Subscriber Identity (IMSI) of Terminal B 4, or alternatively a NAF-initial key. The IMPI and/or the NAF-initial Key may be used as a base to generate the modifying value using a cryptographic hash. Note that Terminal B 4 can independently also generate the modifying value. The KMS 3 then derives a Terminal B 4 unique key by applying a KDF on the modifying value and the key Key, Key_B=KDF (Key, Mod_B).

S28. The KMS 3 sends key Key_B and Mod_B to Terminal B 4. The communication between Terminal B and the KMS should be protected. This protection may be based on a NAF-Key using GBA functions.

S29. Terminal B 4 sends Mod_B to Terminal A 1*a*. Note that Terminal B 4 could not have sent a response to Terminal A 1*a* including the modifying value in step S26.

S30. Terminal A 1*a* derives Key_B=KDF (Key, Mod_B), and uses this key to secure communications with Terminal B 4.

Note that the KDF may have additional parameters as input as long as they can be made available to Terminal A 1*a*, and Terminal A 1*a* can associate them with the key derivation for Terminal B 4.

Figure 6:
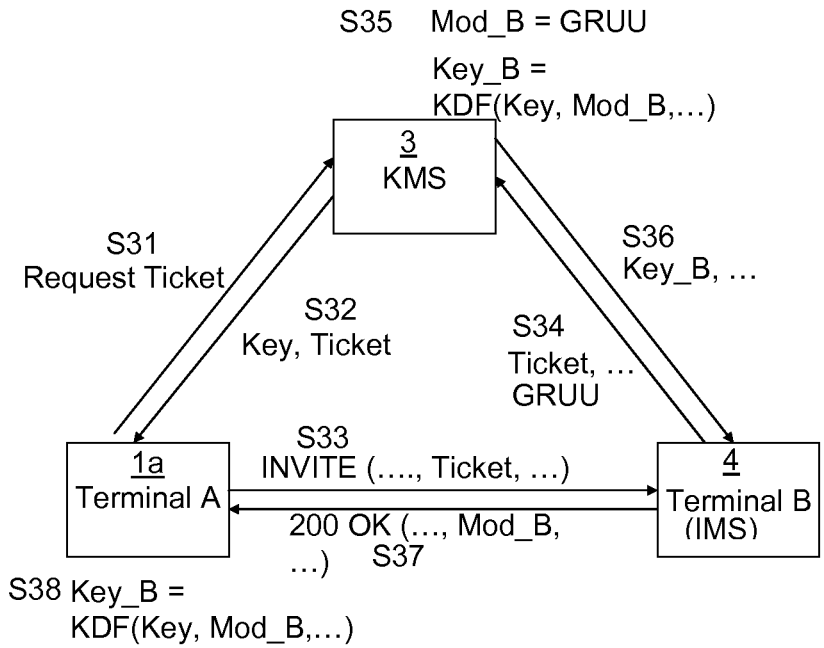
FIG. 6 illustrates schematically in a block diagram signalling and network architecture according to a further embodiment of the invention in which a modifying parameter is defined using a Globally Routable UA URI.

In a further alternative embodiment, Mod_B is defined via using a Globally Routable UA URI (GRUU), as illustrated in FIG. 6. In this embodiment, the following steps apply, with the following numbering corresponding to the numbering used in FIG. 6:

S31. Terminal A 1*a* requests a key and a ticket from the KMS 3. The request and/or ticket may include information about the identity of the recipient(s).

S32. The KMS 3 returns the key and the ticket to Terminal A 1*a*. The key is a base key denoted Key. The Key or a reference to a copy of it stored in the KMS is included in the ticket.

S33. Terminal A 1*a* sends an INVITE directed to the recipient, User B 2, the INVITE including the ticket. The INVITE is routed to User B's Terminal B 4. In this embodiment, Terminal B 4 is an IMS device.

S34. Terminal B 4 sends the ticket to the KMS 3 together with its GRUU (which may be permanent or temporary, or initial information from which the GRUU can be derived). The communication between Terminal B and the KMS should be protected.

S35. The KMS 3 sets the GRUU as the modifying value, Mod_B. The KMS 3 then derives the Terminal B 4 unique key by applying a KDF on the modifying value and the key Key, Key_B=KDF (Key, Mod_B).

S36. The KMS 3 sends key Key_B to Terminal B 4. The communication between Terminal B and the KMS should according to this embodiment be confidentiality protected and/or the message carrying Key_B may be sent in e.g. a SIP MESSAGE using the GRUU to define the receiver. This ensures that the result would not reach someone trying to pose as the real device defined by the used GRUU.

S37. Terminal B 4 sends Mod_B (the GRUU) to Terminal A 1*a*. Note that Terminal B could have sent a response to Terminal A 1*a* including the modifying value already in step S34.

S38. Terminal A 1*a* derives Key_B=KDF (Key, Mod_B).

As with the other embodiments, the KDF may use additional parameters as input as long as they can be made available to Terminal A 1*a*, and Terminal A 1*a* can associate them with the key derivation for Terminal B 4.

In a further embodiment, compatible with all of the preceding embodiments, Terminal A 1*a* sends to Terminal B 4 a second modifying parameter Mod_A along with the ticket. Mod_A is generated by User A's device using a random number generator. In this embodiment, Key_B is derived using Mod_A, for example Key_B=KDF (Key, Mod_B, Mod_A) with a KDF having the property that no non-trivial information about Key can feasibly be derived from Key_B=KDF (Key, Mod_A, Mod_B).

The use of Mod_A allows a ticket to be reused, but for fresh keys to be obtained for each new communication. Terminal A requests a ticket from the KMS 3 and can then use it for several calls toward any users designated as recipients in the ticket. For each communication, Terminal A generates a new Mod_A.

A first requirement of the KDF is that no non-trivial information about Key can feasibly be derived from KDF (Key, Mod_A, Mod_B). A further specific requirement is that that KDF (Key, Mod_B, Mod_A) should give no non-trivial information about KDF (Key, Mod_A, Mod_B). This to ensure that a malicious user cannot interchange the roles of the A and B modifiers. Examples of functions that satisfy these requirements are termed pseudo-random functions.

Figure 7:
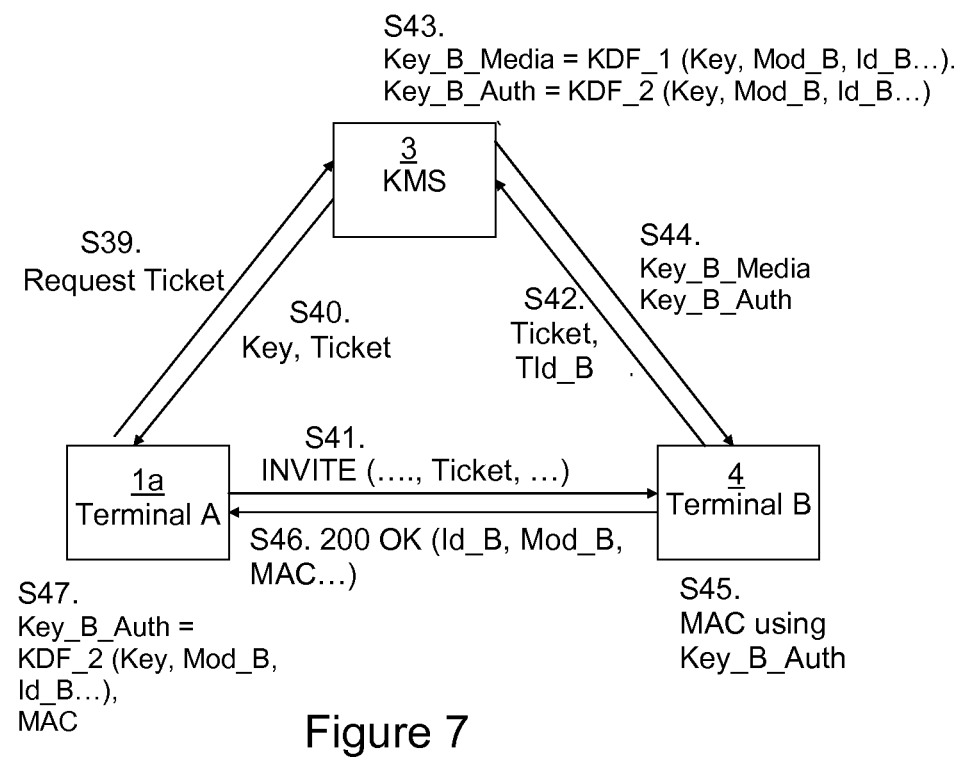
FIG. 7 is a signalling diagram illustrating signalling according to a further embodiment of the invention.

The above description describes key management for enabling secure communication between two or more parties. However, in an alternative embodiment of the invention, a similar method is used to allow authentication of a device or user. In some circumstances, the originator of a communication requires assurances about the identity of the terminating party in addition to securing the communication but in other cases this is required even where secure communication is not necessary. In this embodiment of the invention, a key is derived that depends on the user identity, and the key is used to calculate a Message Authentication Code (MAC). In the following example, a call directed to the recipient, User B, is forked, and the Id_Receiver used in the ticket is a public identity associated with User B, Id_B. Each terminal associated with User B has a private identity associated with User B's public identity. The following numbering corresponds to the numbering of FIG. 7:

S39. Terminal A 1a sends a request to the KMS 3 for a ticket which is intended to be usable for a given user identity. A given user identity may identify a single user, an identified group of users or any user.

S40. The KMS 3 returns the ticket and the ticket key, Key to User A. A typical ticket content is (Id_A, Id_Receiver, Key, . . . ).

S41. Terminal A 1a sends an INVITE including the ticket directed to the recipient, Terminal B 4 identified by Id_B (in an IMS network, a public identifier is used).

S42. Terminal B 4 sends the received ticket to the KMS 3, together with a parameter related to Terminal B's user identity and possibly other parameters, e.g. an identity, which it wants to use and be visible towards the caller. The parameter related to Terminal B's identity is denoted TId_B and the identity that Terminal B wants to be visible is called VId_B. The KMS 3 must be able to verify that Id_B, VId_B and TId_B are associated with each other.

S43. The KMS 3 receives the ticket, TId_B and possibly VId_B. The KMS verifies that the identity in the ticket, TId_B and VId_B are associated. If no VId_B was sent from the terminal the KMS selects a VId_B based on ticket or KMS global polices. Then the KMS 3 derives two keys; a media key and an authentication key. The media key (Key_B_Media) is used to protect media, and the authentication key (Key_B_Auth) is used to create an authentication token. The authentication token is the means by which user A 1 can subsequently receive assurance about user B's, identity.

For example, the media key is derived using Key_B_Media=KDF_1 (Key, Mod_B, other parameters) and the authentication key is derived using Key_B_Auth=KDF_2 (Key, Mod_B, VId_B, other parameters). Mod_B is a random value and VId_B is a public identity of user B. Other parameters may be included if required, and may designate different sets of parameters in the two KDFs which may also allow that KDF_1 and KDF_2 can be one and the same function. It is not strictly necessary that Mod_B is the same for both of the KDFs, but if not then both must be signalled to Terminal A 1a.

In an alternative embodiment, the media key and the authentication key are identical. In a further embodiment, the KMS 3 delivers a single key to Terminal B 4 and Terminal B 4 derives a media and an authentication key from that base key. Delivering one key from the KMS and performing some key derivations in the terminal improves signalling efficiency.

In a further embodiment, the KMS 3 derives Key_B_Auth=KDF_2 (Key, Mod_B, VId_B, other parameters), and Terminal B 4 subsequently derives Key_B_Media=KDF_3 (Key_B_Auth, . . . ). This gives stronger key confirmation properties as Terminal A 1a will receive stronger assurance that whoever can produce the right "token" (based on Key_B_Auth) must also be able to deduce Key_B_Media.

S44. The KMS 3 sends the keys to Terminal B 4 together with Mod_B and, if necessary, VId_B.

S45. Terminal B 4 creates an authentication token by calculating a MAC based on Key_B_Auth. The response signalling from Terminal B 4 to Terminal A 1a includes the identity used in the key derivations, unless this identity is known to User A by other means. The response signalling must also contain Mod_B. It is therefore appropriate to calculate the MAC using the identity and Mod_B. If necessary, other parameters may additionally be used to calculate the MAC.

S46. Terminal B 4 sends VId_B, Mod_B and the MAC to Terminal A 1a in a response to the INVITE message sent in step S41.

S47. Terminal A 1a calculates Key_B_Auth and verifies the MAC provided by Terminal B using the calculated Key_B_Auth.

Tickets can be used as a basis for multiple sessions by including also a session modifier Mod_A in the INVITE. In this case, the MAC in the authentication token should be calculated over previously defined parameters and Mod_A.

Figure 8:
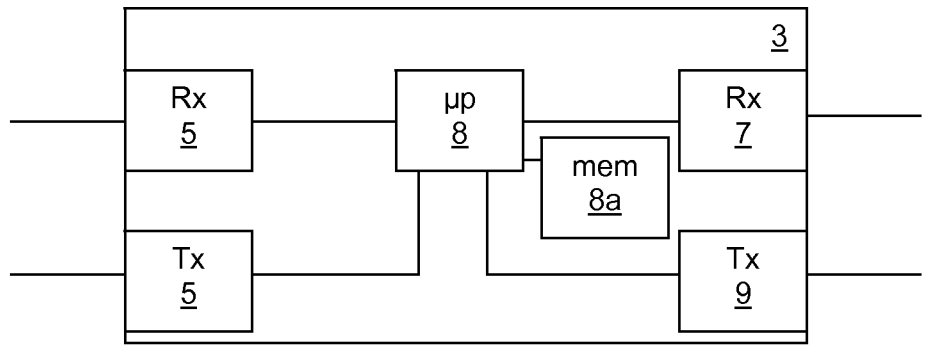
FIG. 8 illustrates schematically in a block diagram a Key Management Server according to an embodiment of the invention.

Referring to FIG. 8, there is illustrated a KMS 3 according to an embodiment of the invention. Note that whilst the following description refers to receiving and transmitting functions, these functions may be embodied in single or multiple receivers, transmitters, or transceivers. The KMS 3 is provided with a first receiver function 5 for receiving a request for a key and a ticket from Terminal A 1a. A first transmitting function 6 is provided for transmitting the key and ticker to Terminal A 1a. A second receiving function 7 is provided for receiving a message from Terminal B 4, the message including the identifier. A processing function 8 is used to generate the Terminal B unique key using the modifying parameter associated with the Terminal B. A second transmitting function 9 is also provided for transmitting the Terminal B unique key to Terminal B, the key being usable to secure communication between the originating device and the terminating device. The processing function 8 is further arranged to generate the modifying parameter prior to generating the terminating device key for the embodiment in which the KMS 3 generates the modifying parameter. The KMS 1 is also provided with a computer program product in the form of a memory 11a used to store a computer program that has instructions usable by the KMS 1 to perform the functions described above.

Figure 9:
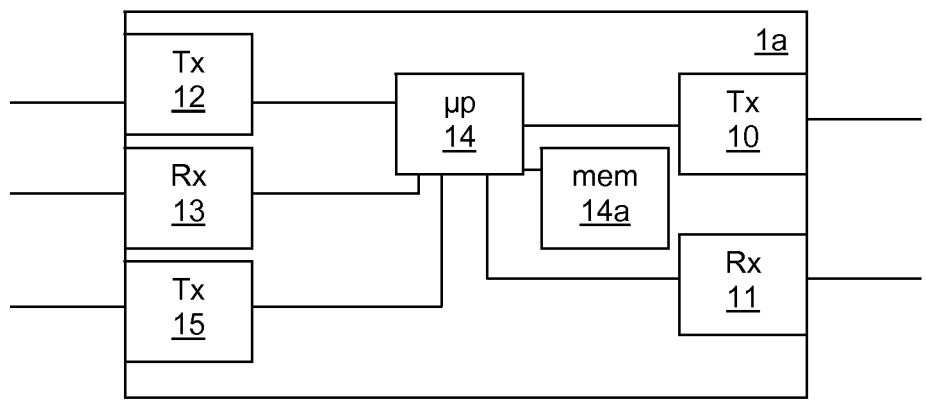
FIG. 9 illustrates schematically in a block diagram an originating device according to an embodiment of the invention.

Referring to FIG. 9, an originating device 1a such as that used by User A 1 is provided with a first transmitting function 10 for sending to a KMS a request for a key and a ticket associated with the identity of User B, with whom the originating device wishes to establish a communication. A first receiving function 11 is arranged to receive from the KMS 3 the user key and the identifier. A second transmitting function 12 is provided for sending to the User B a request to establish a communication. The request includes the ticket. A second receiving function 13 is provided for receiving from Terminal B 4 a modifying parameter. A processor 14 is arranged to use the received modifying parameter and the key to generate a Terminal B unique key. A third transmitting function 15 is provided for sending a communication secured using the Terminal B-unique key to Terminal B. The device 1a is also provided with a computer program product in the form of a memory 14a used to store a computer program that has instructions usable by the intermediate node 1 to perform the functions described above.

Figure 10:
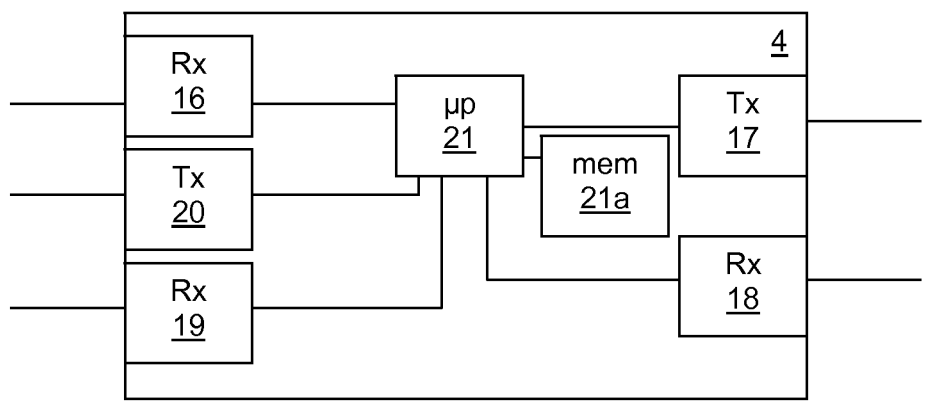
FIG. 10 illustrates schematically in a block diagram a terminating device according to an embodiment of the invention.

FIG. 10 illustrates a terminating device such as Terminal B 4. Terminal B 4 is provided with a first receiver function 16 for receiving from an INVITE from Terminal A 1a, the INVITE including User B's ticket. A first transmitting function 17 is provided for sending the ticket to the KMS 3. A second receiver function 18 is provided for the Terminal B-unique key, and a third receiver function 19 receives from Terminal A 1a a communication secured using the Terminal B-unique key. In an embodiment of the invention, Terminal B 4 is provided with a second transmitter function 20 for sending the modifying parameter to User A. In the embodiment in which Terminal B 4 generates the modifying parameter, Terminal B 4 is provided with a processor 21 for generating the modifying parameter. Terminal B 4 is also provided with a computer program product in the form of a memory 21a used to store a computer program that has instructions usable by the intermediate node 1 to perform the functions described above.

The invention ensures that device-unique keys are generated for devices submitting the same ticket to the KMS 3. The keys are not only unique between the two users, but can also be unique for each device. Embodiments of the invention ensure that other devices, using the same user subscription, cannot obtain/derive the same key by pretending to be another device. Keys can be used to authenticate devices and users, and alternatively or additionally to secure communications. Key management is therefore provided where a user wishes to establish a communication with another user but does not know which of the other user's devices the communication will be forked to.

Compared to options where the key is generated by the Terminal B alone, there is no need for a Public Key Infrastructure (PKI) nor an already existing pre-shared key between Terminal A and Terminal B.

It will be appreciated by the person of skill in the art that various modifications may be made to the embodiments described above without departing from the scope of the present invention as defined by the claims. For example, the description above assumes that all users (e.g. User A 1 and User B 2 of FIG. 2) use the same KMS 3. A person skilled in the art will appreciate that a different KMS could be used by User A 1 and User B 2 by an additional protocol by which the KMS of User B 2 can communicate with the KMS of User A 1.

The invention claimed is:

1. A method of key management at an initiator device for use in a communication network, the method comprising:
    sending from the initiator device to a Key Management Server a request for a key and a ticket;
    receiving at the initiator device the requested key and ticket from the Key Management Server, the ticket including the key or a reference to a copy of the key;
    sending a request to establish communication from the initiator device to multiple different recipient devices as a forked communication invitation, the request including the ticket, the ticket being resolvable into different device-unique keys for different ones of the recipient devices that request resolution of the ticket;
    obtaining at the initiator device a modifying parameter based on which the same or a different Key Management Server has or will resolve the ticket into a device-unique key for a particular one of the recipient devices;
    at the initiator device, generating the device-unique key for the particular one of the recipient devices based on the modifying parameter; and
    engaging in a communication invited by the forked communication invitation with the particular one of the recipient devices, including using the device-unique key for authentication or secure communication with the particular one of the recipient devices.

2. The method of claim 1, wherein the modifying parameter is uniquely associated with the particular one of the recipient devices.

3. The method of claim 1, further comprising receiving the modifying parameter from the particular one of the recipient devices, or the Key Management Server from which the requested key and ticket are received, or the Key Management Server that has or will resolve the ticket into the device-unique key for the particular one of the recipient devices.

4. The method of claim 1, wherein the modifying parameter is any of a pseudo-random number, an identity associated with the particular one of the recipient devices, a Globally Routable User Agent (UA) Uniform Resource Identifier, a Network Application Function-initial key, an IP Multimedia Private Identity associated with the particular one of the recipient devices, and an International Mobile Subscriber Identity associated with the particular one of the recipient devices.

5. The method of claim 1, wherein generating the device-unique key comprises generating the device-unique key as a function of the modifying parameter and at least one further parameter, wherein the at least one further parameter is any of a time stamp, an identity associated with the initiator device, an identity associated with the particular one of the recipient devices, an identity associated with a user of the initiator device, an identity associated with a user of the particular one of the recipient devices, an identity associated with the Key Management Server from which the requested key and ticket are received, and an identity associated with the Key Management Server that has or will resolve the ticket into the device-unique key for the particular one of the recipient devices.

6. The method of claim 1, wherein generating the device-unique key comprises generating the device-unique key also as a function of an identity parameter relating to the identity of a user of the particular one of the recipient devices.

7. The method of claim 1, wherein the particular one of the recipient devices and the ticket are associated with a user identity, and wherein the user identity identifies one of a particular user, a group of users, and any user.

8. A method at a recipient device for use in a communication network, the method comprising:
    receiving at the recipient device from an initiator device a request to establish communication, the request including a ticket, the ticket including a key or a reference to a copy of the key, wherein the request to establish communication is a forked communication invitation received from the initiator device by multiple different recipient devices;
    sending the ticket from the recipient device to a Key Management Server with a request to resolve the ticket;
    responsive to the request, receiving a device-unique key at the recipient device from the Key Management Server, wherein the device-unique key is a modified version of the key which has been modified to be unique from any other key returnable to a different one of the recipient devices in response to a request to resolve the same ticket; and engaging in a communication invited by the forked communication invitation with the initiator device, including using, by the recipient device, the device-unique key for authentication or secure communication with the initiator device.

9. The method of claim 8, further comprising sending to the initiator device and/or the Key Management Server a modifying parameter used to generate the device-unique key, wherein the modifying parameter is uniquely associated with the recipient device.

10. The method of claim 8, wherein the recipient device and the ticket are associated with a user identity, and wherein the user identity identifies one of a particular user, a group of users, and any user.

11. An initiator device configured for use in a communication network, the initiator device comprising:
a processor and a memory, the memory containing instructions executable by the processor whereby the initiator device is configured to:
send from the initiator device to a Key Management Server a request for a key and a ticket;
receive at the initiator device the requested key and ticket from the Key Management Server, the ticket including the key or a reference to a copy of the key;
send a request to establish communication from the initiator device to multiple different recipient devices as a forked communication invitation, the request including the ticket, the ticket being resolvable into different device-unique keys for different ones of the recipient devices that request resolution of the ticket;
obtain at the initiator device a modifying parameter based on which the same or a different Key Management Server has or will resolve the ticket into a device-unique key for a particular one of the recipient devices;
generate the device-unique key for the particular one of the recipient devices based on the modifying parameter; and
engage in a communication invited by the forked communication invitation with the particular one of the recipient devices, including using the device-unique key for authentication or secure communication with the particular one of the recipient devices.

12. The initiator device of claim 11, wherein the modifying parameter is uniquely associated with the particular one of the recipient devices.

13. The initiator device of claim 11, wherein the memory contains instructions executable by the processor whereby the initiator device is configured to receive the modifying parameter from the particular one of the recipient devices, or the Key Management Server from which the requested key and ticket are received, or the Key Management Server that has or will resolve the ticket into the device-unique key for the particular one of the recipient devices.

14. The initiator device of claim 11, wherein the modifying parameter is any of a pseudo-random number, an identity associated with the particular one of the recipient devices, a Globally Routable User Agent (UA) Uniform Resource Identifier, a Network Application Function-initial key, an IP Multimedia Private Identity associated with the particular one of the recipient devices, and an International Mobile Subscriber Identity associated with the particular one of the recipient devices.

15. The initiator device of claim 11, wherein the memory contains instructions executable by the processor whereby the initiator device is configured to generate the device-unique key as a function of the modifying parameter and at least one further parameter, wherein the at least one further parameter is any of a time stamp, an identity associated with the initiator device, an identity associated with the particular one of the recipient devices, an identity associated with a user of the initiator device, an identity associated with a user of the particular one of the recipient devices, an identity associated with the Key Management Server from which the requested key and ticket are received, and an identity associated with the Key Management Server that has or will resolve the ticket into the device-unique key for the particular one of the recipient devices.

16. The initiator device of claim 11, wherein the memory contains instructions executable by the processor whereby the initiator device is configured to generate the device-unique key also as a function of an identity parameter relating to the identity of a user of the particular one of the recipient devices.

17. The initiator device of claim 11, wherein the particular one of the recipient devices and the ticket are associated with a user identity, and wherein the user identity identifies one of a particular user, a group of users, and any user.

18. A recipient device for use in a communication network, the recipient device comprising:
a processor and a memory, the memory containing instructions executable by the processor whereby the recipient device is configured to:
receive at the recipient device from an initiator device a request to establish communication, the request including a ticket, the ticket including a key or a reference to a copy of the key, wherein the request to establish communication is a forked communication invitation received from the initiator device by multiple different recipient devices;
send the ticket from the recipient device to a Key Management Server with a request to resolve the ticket;
responsive to the request, receive a device-unique key at the recipient device from the Key Management Server, wherein the device-unique key is a modified version of the key which has been modified to be unique from any other key returnable to a different one of the recipient devices in response to a request to resolve the same ticket; and
engage in a communication invited by the forked communication invitation with the initiator device, including using, by the recipient device, the device-unique key for authentication or secure communication with the initiator device.

19. The recipient device of claim 18, the memory containing instructions executable by the processor whereby the recipient device is configured to send to the initiator device and/or the Key Management Server a modifying parameter used to generate the device-unique key, wherein the modifying parameter is uniquely associated with the recipient device.

20. The recipient device of claim 18, wherein the recipient device and the ticket are associated with a user identity, and wherein the user identity identifies one of a particular user, a group of users, and any user.

* * * * *